US011984917B2

(12) United States Patent
Freitas et al.

(10) Patent No.: US 11,984,917 B2
(45) Date of Patent: May 14, 2024

(54) ELECTRONICS FOR USE IN SMART CARDS AND OTHER NEAR FIELD RF COMMUNICATIONS ENABLED SYSTEMS

(71) Applicant: Drayson Technologies (Europe) Limited, London (GB)

(72) Inventors: Vitor Freitas, London (GB); Victor Diaz, London (GB); Sebastian Litwinow, London (GB); Alison Lloyd, London (GB)

(73) Assignee: DRAYSON TECHNOLOGIES (EUROPE) LIMITED, London (GB)

( * ) Notice: Subject to any disclaimer, the term of this patent is extended or adjusted under 35 U.S.C. 154(b) by 324 days.

(21) Appl. No.: 17/439,569

(22) PCT Filed: Mar. 13, 2020

(86) PCT No.: PCT/GB2020/050654
§ 371 (c)(1),
(2) Date: Sep. 15, 2021

(87) PCT Pub. No.: WO2020/188258
PCT Pub. Date: Sep. 24, 2020

(65) Prior Publication Data
US 2022/0158667 A1 May 19, 2022

(30) Foreign Application Priority Data
Mar. 15, 2019 (GB) ...................................... 1903586

(51) Int. Cl.
*H02J 50/20* (2016.01)
*H02J 50/10* (2016.01)
(Continued)

(52) U.S. Cl.
CPC ............ *H04B 1/0458* (2013.01); *H02J 50/10* (2016.02); *H02J 50/20* (2016.02); *H04B 1/18* (2013.01)

(58) Field of Classification Search
None
See application file for complete search history.

(56) References Cited

U.S. PATENT DOCUMENTS 6,774,865 B1 8/2004 Serra
7,347,379 B2* 3/2008 Ward ................... H01Q 1/2208
340/505

(Continued)

OTHER PUBLICATIONS

International Search Report and Written Opinion dated Jun. 17, 2020 for corresponding International Application No. PCT/GB2020/050654.

(Continued)

*Primary Examiner* — Tuan A Tran
(74) *Attorney, Agent, or Firm* — TAROLLI, SUNDHEIM, COVELL & TUMMINO L.L.P.

(57) ABSTRACT

A mounting system for a near field radio frequency (RF) communicator, the system comprising: a splitter, for splitting an alternating electrical signal received from an antenna of the smart card and having: a first output for providing a first part of the alternating electrical signal to an RF input of said chip, and a second output for providing a second part of the alternating electrical signal for powering an auxiliary circuit; a matching network, at the first output of the splitter, and arranged to provide: an input impedance selected based on the impedance of the first output of the splitter, and an output impedance selected based on the impedance of the RF input of said chip; wherein the network comprises a first inductor for electrical connection to said chip and a second inductor, and the second inductor is arranged for inductive (Continued)

coupling to the first inductor thereby to provide RF coupling, with DC isolation and/or common mode isolation, to the RF input of said chip.

20 Claims, 5 Drawing Sheets (51) Int. Cl.
H04B 1/04 (2006.01)
H04B 1/18 (2006.01)

(56) References Cited

U.S. PATENT DOCUMENTS

| | | | | |
|---|---|---|---|---|
| 8,588,682 | B2* | 11/2013 | Wilson | G05F 1/46 |
| | | | | 323/267 |
| 9,177,182 | B2* | 11/2015 | Okuda | G06K 7/10237 |
| 9,385,415 | B2* | 7/2016 | Roh | H01Q 1/526 |
| 9,641,227 | B2* | 5/2017 | Moon | H04B 5/0031 |
| 9,674,646 | B2* | 6/2017 | Jang | H04W 4/80 |
| 9,762,292 | B2* | 9/2017 | Manian | H04B 5/0037 |
| 9,800,295 | B2* | 10/2017 | Jang | G06Q 20/3278 |
| 9,964,991 | B2* | 5/2018 | Kim | H04B 5/0056 |
| 9,985,693 | B2* | 5/2018 | Moon | H03H 7/40 |
| 10,110,281 | B2* | 10/2018 | Ding | H04B 5/0031 |
| 10,211,679 | B1* | 2/2019 | Li | H02J 50/001 |
| 10,326,193 | B2* | 6/2019 | Tramoni | G01R 21/00 |
| 10,700,422 | B2* | 6/2020 | Moon | H01Q 7/00 |
| 11,005,514 | B2* | 5/2021 | Cordier | H03F 1/565 |
| 11,038,553 | B2* | 6/2021 | Ding | H04B 5/0031 |
| 2017/0288473 | A1 | 10/2017 | Choi | |
| 2018/0342798 | A1* | 11/2018 | Lin | H04B 5/00 |

OTHER PUBLICATIONS

GB Search Report dated Sep. 12, 2019 for corresponding GB Application No. 1903586.4.
Thuringer, Ronald, (Apr. 2002) PHD Thesis—"Characterization of Integrated Lumped Inductors and Transformers".

* cited by examiner

ELECTRONICS FOR USE IN SMART CARDS AND OTHER NEAR FIELD RF COMMUNICATIONS ENABLED SYSTEMS

RELATED APPLICATIONS

The present application is a U.S. National Stage application under 35 USC 371 of PCT Application Serial No. PCT/GB2020/050654, filed on 13 Mar. 2020; which claims priority from GB Patent Application No. 1903586.4, filed 15 Mar. 2019, the entirety of both of which are incorporated herein by reference.

FIELD OF INVENTION

The present invention relates to methods and apparatus, and more particularly to methods and apparatus for systems comprising near field radio frequency (RF) communications functionality, and more particularly to such systems in which the near field RF communications functionality is provided by an integrated circuit.

BACKGROUND

A variety of near field RF communications enabled devices are available. These include hand held mobile telephones (cell phones), smart cards, and computer peripherals to name a few. In many of these use cases miniaturisation is a significant problem product designers, users, consumers, and standard form-factors all place significant constraints on the size and shape of components which can be added to these devices. This is a particular problem for smart cards, but it is also relevant to other near field RF communications enabled devices.

Smart cards, also known as chip cards, or integrated circuit cards (ICC), are increasingly prevalent. A wide variety of such pocket-sized cards with embedded integrated circuits are in use in a wide variety of applications. The most frequent uses of such cards relate to financial transactions, mass transit systems, and access control. Smart cards are made of plastic, generally polyvinyl chloride, but sometimes polyethylene-terephthalate-based polyesters, acrylonitrile butadiene styrene or polycarbonate. Reusable smart cards may also be made from paper. Such cards often incorporate an integrated circuit, IC, and some source of power such as a near field RF communications interface for powering the IC and providing data communications to and from it.

An IC device, herein called a chip, traditionally consists of a single semiconductor die which has a particular function and which is adapted to interact with other chips and components. For example, a traditional chip might be a microprocessor, a memory controller, or a memory array. IC systems may include two or more chips, as well as other electronic and electrical components, each attached to and interconnected through a mounting system such as a printed circuit board.

Near field RF communication requires an antenna of one near field RF communicator to be present within the alternating magnetic field (H field) generated by the antenna of another near field RF communicator by transmission of an RF signal (for example a 13.56 MegaHertz signal) to enable the magnetic field (H field) of the RF signal to be inductively coupled between the communicators. The RF signal may be modulated to enable communication of control and/or other data. Ranges of up to several centimetres (generally a maximum of 1 metre) are common for near field RF communicators.

Near field communication in the context of this application may be referred to as near-field RF communication, near field RFID (Radio Frequency Identification) or near field communication. The range of such devices depends on the antenna used but may be, for example, up to 1 metre.

Communication of data between NFC communicators may be via an active communication mode in which the NFC communicator transmits or generates an alternating magnetic field modulated with the data to be communicated and the receiving NFC communicator responds by transmitting or generating its own modulated magnetic field, or via a passive communication mode in which one NFC communicator transmits or generates an alternating magnetic field and maintains that field and the responding NFC communicator modulates the magnetic field to which it is inductively coupled with the data to be communicated, for example by modulating the load on the inductive coupling ("load modulation"). Near field RF communicators may be actively powered, that is have an internal or associated power source, or passively powered, that is derive a power supply from a received magnetic field. Generally an RF transceiver will be actively powered while an RF transponder may be passively or actively powered.

Examples of near field RF communicators are defined in various standards for example ISO/IEC 18092 and ISO/IEC 21481 for NFC communicators, and ISO/IEC 14443 and ISO/IEC 15693 for near field RF communicators.

The ability of near field RF communications devices to be passively powered is a significant benefit. Some near field communicator chips also provide auxiliary power outputs. This can enable power harvested by the near field RF communicator to be used by other circuits.

SUMMARY

Aspects and examples of the present disclosure are set out in the claims. These and other features of the disclosure described herein aim to improve functionality of near field RF communications enabled devices in general, and of smart cards in particular.

Near field RF communicator chips may have a so-called RF side, connected to the air interface for RF communication, and a so-called DC-side, often comprising logic circuitry and data communications interfaces. The DC side of the chip may be referenced to a DC ground, whereas the RF side of the chip may be a differential, floating input. Any conduction path or so-called ground-loop, even indirectly, between the DC side and the RF side of the chip may cause significant problems.

This can become a significant issue in near field RF communications enabled devices having auxiliary functionality which is powered by energy harvested from the near field RF communicators antenna (e.g. by an auxiliary rectifier separate from the near field RF communicator). There are also significant difficulties in addressing this problem in compact systems such as smart cards.

Embodiments of the disclosure aim to address these and other technical problems. An aspect of the disclosure provides an impedance matching network for connecting a near field RF communicator, such as a chip to a splitter. The impedance matching network comprises a first inductor for electrical connection to said near field RF communicator and a second inductor for electrical connection to the splitter. The first inductor and the second inductor provide RF coupling between the splitter and an RF input of said near field RF communicator by way of inductive coupling. These inductors provide DC isolation between the splitter and the near field RF communicator, and may also provide common mode rejection wherein common mode voltage applied to the first inductor (as opposed to differential voltage applied across it) are not communicated to the second inductor, and vice versa.

This matching network may be used in a mounting system for a near field radio frequency (RF) communicator, the system comprising:

a splitter, for splitting an alternating electrical signal received from an antenna of the smart card and having: a first output for providing a first part of the alternating electrical signal to an RF input of said chip, and a second output for providing a second part of the alternating electrical signal for powering an auxiliary circuit. In these embodiments, the matching network may be connected to the first output of the splitter, and arranged to provide: an input impedance selected based on the impedance of the first output of the splitter, and an output impedance selected based on the impedance of the RF input of said chip.

A dielectric substrate may carry the matching network and may separate the first inductor from the second inductor. The matching network may comprise a first part, electrically connected (e.g. by DC conductive connections and/or capacitive connections) to the first output of the splitter and comprising the first inductor. The matching network may also comprise a second part electrically connected (e.g. by DC conductive connections and/or capacitive connections) to the near field RF communicator. This second part of the matching network comprises a second inductor, arranged for inductive coupling with the first inductor. Thus, this second part of the matching network may be coupled to the first part of the matching network only by this inductive coupling. This, in the absence of DC conductive connections and capacitive connections between the first part and the second part, can provide RF electrical communication between the two parts of the matching network but with DC isolation and common mode isolation between the two.

The first part of the matching network may comprise a plurality of impedances connected with the first inductor to provide a first part impedance which matches the impedance of the first output of the splitter. The mutual inductance of the two inductors may contribute to this first part impedance.

An aspect of the disclosure provides a near field RF communications apparatus comprising an impedance matching network for connection between a splitter and a near field RF communicator, wherein the impedance matching network comprises a first inductor for electrical connection to said near field RF communicator and a second inductor for electrical connection to said splitter, and the second inductor is arranged for inductive coupling to the first inductor thereby to provide RF coupling to the RF input of said near field RF communicator. Generally, the second inductor is arranged for inductive coupling to the first inductor by the first inductor and the second inductor are interleaved with each other. This may provide RF coupling between the splitter and the near field RF communicator. The arrangement of the first inductor and the second inductor may provide DC isolation between the splitter and the near field RF communicator, and may also provide common mode rejection, so that any common mode signal from the splitter is attenuated, for example completely, by the matching network and so not applied to the near field RF communicator.

The first inductor and the second inductor may be provided by printed coil inductors, or by packaged components such as SMD components.

The first inductor may be interwoven with and/or may surround the second inductor, or vice versa. For example the first inductor and the second inductor may be comprise wire wound inductors wound on a shared (common) core. As another example, the inductors may be provided by conductive tracks carried on a dielectric substrate, and the conductive tracks of the first inductor may be interleaved with those of the second inductor. The two inductors may share the same area of the substrate. For example, the first inductor may comprise at least one coil turn which is disposed between two coil turns of the second inductor, so that the conductors of one inductor are interleaved with those of the other. The conductors of one inductor may provide a perimeter of the area occupied by the other. One part of the perimeter of this shared area may be provided by the conductors of one inductor, and the remainder of the perimeter may be provided by the other. The two inductors may be provided on opposite surfaces of the substrate, or on the same surface of the substrate. In this latter example the inductors may comprise one or more conductive links which are not on that surface.

An aspect provides a near field communications enabled apparatus, comprising a mounting system for a near field radiofrequency (RF) communicator chip. The systems described herein may comprise mounting systems, for mounting a near field RF communications chip in a device such as a smart card. An example of a mounting system is a circuit board, such as a printed circuit board, having a chip seat for electrical and mechanical fixtures for connecting a near field RF communications chip.

Apparatus to provide such a mounting system may be adapted for use in a smart card system—e.g. it may be arranged to provide a component for integration into a smart card. However, such mounting systems may also be used in other low-profile and/or miniaturised systems and so may find particular utility in wearables, such as wrist watches and clothing with integrated near field RF communications functionality and auxiliary electronic circuitry.

Such apparatus generally comprises a splitter, for splitting an alternating electrical signal received from an antenna of the smart card. The splitter generally has a first output for providing a first part of the alternating electrical signal to an RF input of said chip, and a second output for providing a second part of the alternating electrical signal for powering an auxiliary circuit. Such a splitter may be provided by a Wilkinson divider, or a complex voltage divider network such as that described and claimed in the applicant's copending patent applications GB1805310, GB1807396.5, and GB1811880.2 the entirety of which applications is hereby incorporated herein by reference as if fully set forth herein.

The splitter however is optional and may be made and sold separately, for example, it may be installed into the apparatus of the present disclosure during manufacture of the near field communications enabled apparatus.

This apparatus does however always comprise a matching network, for connection between the first output of a splitter and the RF inputs of a near field RF communicator such as a chip. This matching network is arranged to provide an input impedance selected based on the impedance of the first output of the splitter. For example, the input impedance of the chip matching network 11 is chosen to match the output impedance of the first port of the splitter. Impedance matching need not be perfect, but is generally chosen to match well enough to avoid very significant signal losses due to reflection. The impedance matching network may be arranged to provide better matching at lower power than at higher power. Likewise, the matching network also has an output impedance selected based on the impedance of the RF inputs of the near field RF communicator chip. This matching network (also referred to herein as a "chip matching network") comprises a first inductor for electrical connection to said chip and a second inductor. The second inductor is arranged for inductive coupling to the first inductor, but is not electrically connected (e.g. by conductive connections) to the first inductor. This arrangement of the two inductors can thus provide RF coupling to the RF input of the chip, but with DC isolation between the RF input of the chip and the remaining circuitry of the apparatus. For example the two inductors may be arranged to provide common mode isolation between one inductor and the other. The inductors only couple differential signals, from one to the other, but may completely reject common mode signals.

The matching network is generally carried by a dielectric substrate. This substrate can separate the first inductor from the second inductor. For example the two inductors may be provided on opposite surfaces of the substrate and/or one inductor may be provided on a region of the substrate which is adjacent to a region of the substrate upon which the other is disposed so that the two are held spaced apart by the substrate. One particularly efficient way to do this is to have one inductor surround the other on the substrate. This can enable relatively high self-inductance and relatively high mutual inductance (and high coupling factor) to be provided in compact designs. So called printed coil inductors may offer particular advantages when used in this way as described below with reference to FIG. 4 and FIG. 5.

The matching network may comprise two separate parts and these two parts may be DC isolated from each other, and/or arranged to provide common mode rejection. In these configurations, a first part of the network is arranged for electrical connection to a first output of a splitter and comprises the first inductor. The second part of the matching network is DC isolated from the first output of the splitter, and comprises the second inductor. For example the arrangement of the two inductors provides RF coupling between the two parts of the matching network, but without any path for the conduction of DC current from one to the other. Accordingly, only oscillating differential signals provided to the first part of the matching network is transferred to the second part of the matching network and vice versa. To provide common mode rejection, there may be no capacitor components connecting the two parts of the network.

The first inductor and the second inductor may comprise a surface mount inductor, and may be disposed in the same component package. This package may be compact, for example less than 350 micron high, for example less than 330 micron. Such compact size may be provided by two wire wound inductors comingled so that two sets of windings are disposed on single core, which may comprise a high permeability material such as a ferromagnetic material, such as ferrite. The desired properties of the two inductors may also be provided by wire wound and other configurations in which two flat windings are arranged one on top of the other. These components may be packaged, for example as a so-called surface-mount device (SMD). Whether SMD packaged or not, the inductors may be disposed in a recess in the substrate such as a through-hole.

The first inductor and the second inductor may comprise printed coil inductors having any one or more of the configurations described herein. The first inductor may occupy a first region on a first surface of the dielectric substrate and the second inductor occupies second region on a second surface of the dielectric substrate, wherein the first region partially overlaps the first region. For example the two inductors may be provided on opposite major surfaces of the substrate. They may also be arranged so that one inductor surrounds the other on the substrate. This may be achieved by having one inductor be provided as a printed coil on (one or both sides of) a first region of the substrate, and the other of the two inductors provided on a second region of the substrate which surrounds (e.g. circumscribes) the first region. Other types of partial overlap may be provided, for example the two inductors may be of the same or similar size and shape and may be misaligned relative to each other so that the two overlap but are on opposite surfaces of the substrate. The electrical connections to each inductor may be provided on a region of the substrate which is not occupied and/or not surrounded by the other of the two inductors. One way to do this is to provide non-circular coils, but other approaches are possible—for example using a conductive via and/or constructions such as that illustrated in FIG. 4.

A first layer of conductive material, provided on the substrate, may be configured to provide the first inductor and to provide an electrical connection between the second first inductor and the first output of the splitter. A second layer of conductive material, provided on the substrate, may be configured to provide the second inductor and to provide an electrical connection between the first second inductor and the RF input of said chip. These two layers of conductive material may be separated by a single dielectric layer. In some embodiments however the dielectric may comprise a plurality of layers, and one or more conductive layers may be sandwiched between the dielectric layers. It will be appreciated in the context of the present disclosure that the term "layer" in the context of the conductors may comprise conductors which are deposited on a surface of a dielectric, and they need not (indeed generally do not) provide a single contiguous structure which spans the entire surface. Instead typically, such a layer comprises a number of discrete conductive structures.

For example, the dielectric substrate may comprise at least two dielectric layers with an intermediate electrically conductive layer between the two dielectric layers. The intermediate electrically conductive layer is arranged to provide at least one of: an electrical connection between the first inductor and the RF input of said chip; and an electrical connection between the second inductor and the first output of the splitter.

The apparatus described herein may comprise an auxiliary rectifier, connected to the second output of the matching network for providing DC power to an auxiliary circuit. The auxiliary rectifier is generally separate from the near field RF communicator, which may comprise its own rectifier. The auxiliary circuit (which is powered by the auxiliary rectifier) may be connected to a DC logic output of the near field RF communicator (e.g. a chip) for performing data operations. Examples of auxiliary circuits include biometric functionality, such as fingerprint sensors and image capture devices. The auxiliary circuit may comprise a human user interface such as a touch screen, a keypad for obtaining alphanumeric input from a user and/or a display.

A DC output of the rectifier may provide a ground reference for circuits connected to the DC logic output of the near field RF communicator.

A process of manufacturing smartcards may comprise manufacturing card blanks which comprise the body of the smartcard, and the inductive coupler (e.g. a near field RF communications antenna), and a mounting system such as any one of those described and/or claimed herein. Such a mounting system may comprise a dielectric substrate, such as a PCB or similar, carrying a chip assembly seat for seating a near field RF communications chip assembly in the card blank. The antenna, and a substrate carrying the components of the smartcard circuitry described and/or claimed herein may be integrated into a smart card blank. It will thus be appreciated that smart card circuitry of the present disclosure may be provided in a modular unit, such as a card blank with chip seat, to enable a near field RF communicator to be inserted into the smartcard blank during manufacture.

Accordingly in an aspect there is provided a smartcard blank comprising: an inductive coupler for coupling inductively with a radio frequency, RF, H-field to provide an alternating RF voltage to the input signal connection of the smartcard circuitry to provide an RF electrical input signal to the smart card circuitry. The smart card blank may have dimensions of a credit card such as that defined in ISO/IEC 7810 standard, for example it may be about 85 mm by about 55 mm (for example 85.60 by 53.98 millimetres). As an alternative, it may have an ID-000 form factor, e.g. about 25 mm by 15 mm (0.98 in×0.59 in) commonly used in SIM cards. The smartcard may comprise a body of a dielectric substance such as plastic, e.g. polyvinyl chloride, or a polyethylene-terephthalate-based polyester. It will be appreciated in the context of the present disclosure that the inductive coupler may be provided into the blank as part of the same manufacturing process as the other smartcard circuitry. In some possibilities the inductive coupler is absent to enable it to be incorporated into the blank separately after the circuitry has been manufactured.

The apparatus described herein has been described with reference to near field RF communications functionality which is implemented in a chip. It will be appreciated in the context of the present disclosure that this is relevant to any near field RF communicator, such as one which may be implemented in more than one integrated circuit and/or in which some of the functionality of the near field RF communicator is provided by circuits which are not carried on a chip.

BRIEF DESCRIPTION OF DRAWINGS

Embodiments of the disclosure will now be described, by way of example only and with reference to the accompanying drawings, in which.

In the drawings like reference numerals are used to indicate like elements.

SPECIFIC DESCRIPTION

Figure 1:
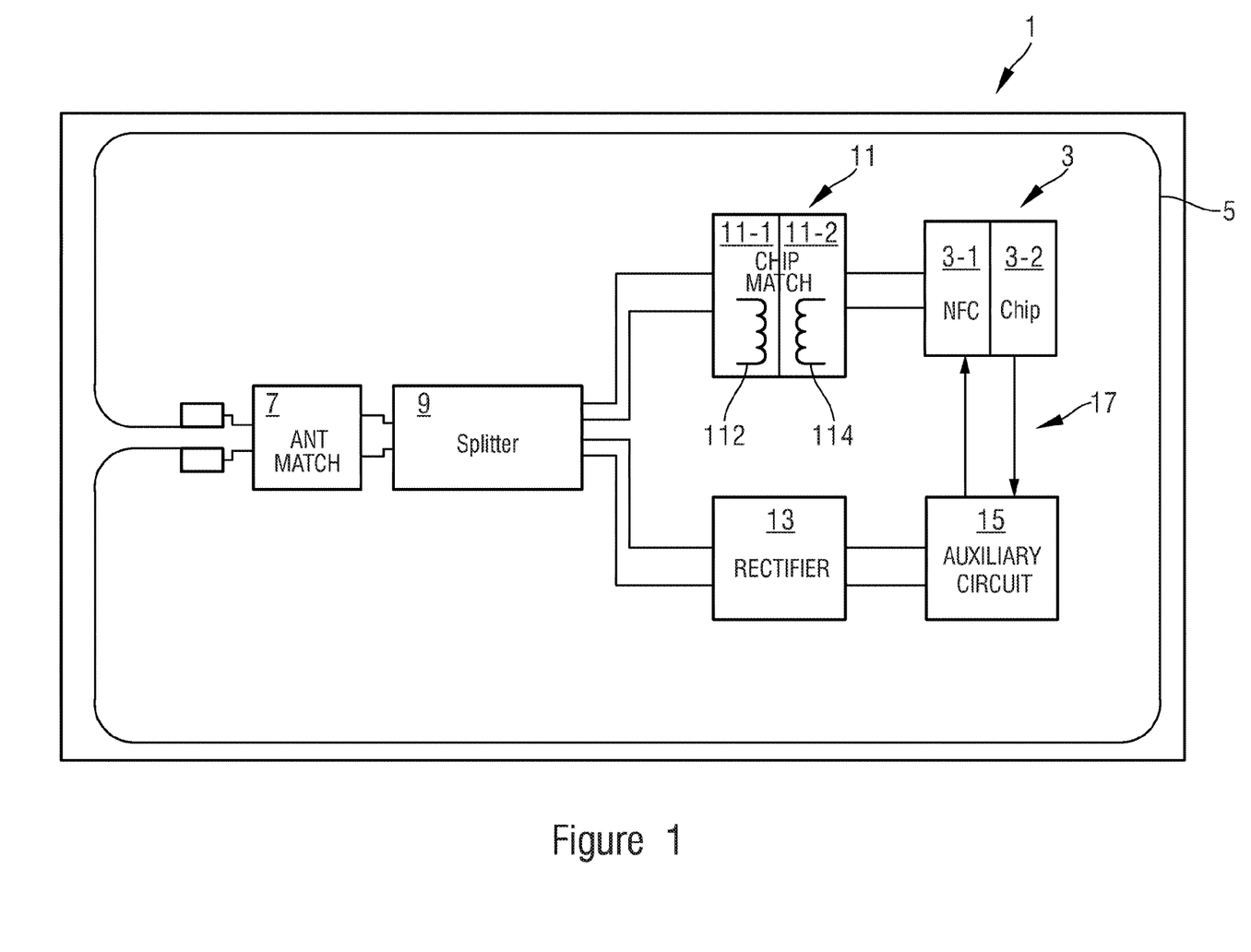
FIG. 1 shows a functional block diagram of near field RF communications apparatus.

FIG. 1 shows a near field RF communications apparatus 1 comprising a near field radiofrequency (RF) communicator chip 3, an antenna 5, an antenna matching network 7, a splitter 9, a chip matching network 11, an auxiliary rectifier 13, and an auxiliary circuit 15.

The antenna matching network 7 connects the antenna 5 to the splitter 9. The splitter 9 is also connected to the chip matching network 11 and to the rectifier. The rectifier 13 is connected to the auxiliary circuit 15, and the chip matching network 11 is connected to the near field RF communicator chip 3. It can thus be seen that the splitter is arranged to split a signal from the antenna so that a first part of the split signal is provided to the rectifier, and a second part of the split signal is provided to the chip matching network.

The chip matching network 11 comprises two inductors 112, 114. These two inductors 112, 114 are arranged so that an alternating electrical signal applied to the first inductor causes inductive coupling (e.g. via an H-field) with a second inductor. The two inductors however are not conductively connected to each other. The first inductor 112 can be connected to the splitter 9, and the second inductor 114 can be connected to the RF inputs of the chip. This can provide RF coupling between the chip 3 and the splitter 9, but with DC isolation between the RF-input of said chip 3 and the splitter 9. The arrangement of the inductors 112, 114, and their mutual inductance, can contribute to the impedance matching provided by the chip matching network 11.

As will be explained in greater detail below with reference to FIG. 2, the chip matching network 11 may comprise two separate parts 11-1, 11-2, linked only by the inductive coupling between the two inductors 112, 114. The first part 11-1 of the chip matching network 11 is configured to provide an input impedance which matches the output impedance of the splitter 9. The second part 11-2 of the chip matching network 11 provides an output impedance which matches the input impedance of the near field RF communicator chip. There is no electrically conductive connection between the first part 11-1 of the chip matching network 11 and the second 11-2, but there is a conduction path for RF signals via the inductive coupling between the two inductors 112, 114. It can thus be seen that the chip matching network 11 comprises two inductors 112, 114, electrically isolated from each other, but spatially arranged relative to each other to provide a degree of mutual inductance, and an appropriate coupling factor, to enable RF energy to flow from the splitter 9 to the chip.

The antenna 5 comprises an electrical conductor such as a conductive track or wire arranged for coupling inductively with an alternating H-field to provide an alternating electrical signal. Typically, such an antenna 5 comprises a loop having one or more turns. It will be appreciated in the context of the present disclosures that an NFC antenna may have a large inductance, perhaps of 1 μH or more. Such antennas may be adapted for coupling with signals in a near field RF frequency band, which generally comprises 13.56 MHz. It will be appreciated in the context of the present disclosure that such signal may have a wavelength of approximately 22 m.

The antenna matching network 7 comprises a network of impedances connected together for providing an input impedance which matches the output impedance of the antenna 5. The antenna matching network 7 is also arranged to provide an output impedance which matches the input impedance of the splitter 9.

The splitter 9 is configured to receive an alternating electrical signal from the antenna, and to divide the signal to provide a first part via the chip matching network 11, to the near field RF communicator chip, and a second part to the auxiliary rectifier 13. This enables the auxiliary rectifier 13 to derive DC power from the antenna while the chip is performing near field RF communications (e.g. using the same RF H-field both for communications by the chip and for deriving power to power the auxiliary circuit). Examples of splitters include Wilkinson dividers, complex voltage dividers, and systems using coupled coils and other splitters such as those described and claimed in the applicant's copending patent applications:

GB1805310.8 the entirety of which is hereby incorporated herein by reference as if fully set forth herein, GB1807396.5 the entirety of which is hereby incorporated herein by reference as if fully set forth herein, GB1811880.2 the entirety of which is hereby incorporated herein by reference as if fully set forth herein The near field RF communicator chip 3 comprises an integrated circuit, which may be implemented as a single semiconductor die. This chip may comprise an RF side 3-1, and a DC side 3-2. The RF side 3-1 may comprise a front end, for connection to the antenna. The front end may include things such as a voltage regulator, a dedicated rectifier for the near field RF communicator, or other circuitry for connecting the near field RF communicator 3 to the antenna. The RF side 3-1 of the chip may also comprise a controller for performing simple data operations such as modulating and demodulating data from signals received via the antenna. The DC side 3-2 of the chip may comprise a data store such as an EEPROM or other memory, and I$^2$C or SPI interface for performing data communications, and a controller. The DC side 3-2 of the chip may also comprise cryptographic hardware (e.g. a secure element).

The auxiliary rectifier 13 may be separate from the near field RF communicator chip, which may of course comprise its own rectifier. The auxiliary rectifier 13 generally comprises a rectifying element, such as a diode, arranged to convert the alternating electrical signal received from the splitter 9 into a direct current, DC, electrical signal for powering the auxiliary circuit.

The auxiliary circuit 15 may comprise circuitry for any additional functionality of the device, such as biometric sensors and/or other data gathering circuitry such as a human user input device, sensing transducers, displays, data processing circuitry such as a microprocessors, ASIC, or programmable controller.

Operation of the apparatus 1 shown in FIG. 1 will now be described. To initiate operation, the device 1 is placed in near field range of another near field RF communicator device, such as a device operating in reader mode. This other device provides an alternating H-field, which may comprise a signal at a carrier frequency (such as 13.56 MHz) onto which data to be communicated may be encoded—e.g. by amplitude shift keying (ASK) or other modulation techniques.

The antenna 5 of the near field RF communications device 1 couples inductively with the RF H-field to provide an alternating electrical signal, via the antenna matching network 7, to the splitter 9. The splitter 9 splits the alternating electrical signal into two parts. The first part is provided to the chip matching network 11, and the second part is provided to the auxiliary rectifier 13. The auxiliary rectifier 13 converts the second part of the signal into DC electrical energy, and provides the DC energy to the auxiliary circuit 15 where it may be used to power the auxiliary functionality and/or to charge an energy store (such as a batter or capacitor).

In the first part 11-1 of the chip matching network 11, the first part of the alternating electrical signal is provided to the first inductor. This causes the first inductor 112 to couple inductively with the second inductor 114 to give rise to an alternating electrical signal in the second inductor 114. The signal in the second inductor 114 has the same carrier frequency and the same data modulated onto it, but is just of lower energy than the original signal (part of which having been provided to the auxiliary rectifier 13). The second inductor 114 then provides this induced signal, via the capacitors in the second part 11-2 of the matching network 11, to the RF inputs of the near field RF communicator chip 3. The near field RF communicator chip 3 may derive power from this received signal, and may operate to decode the data encoded onto the signal by the other device. It may also load modulate the signal for communicating, via the matching network 11, the splitter 9, and the antenna 5, with the other near field RF communicator device, such as a device operating in reader mode. In addition, the DC side 3-2 of the near field RF communicator chip 3 may send and/or receive signals via wired connections 17 to/from the auxiliary circuit 15. This can enable the auxiliary circuit 15 to perform functions such as verification, security etc. to support operations performed by the near field RF communicator chip 3.

Significantly, because the RF inputs of the field RF communicator chip 3 are connected to the second part 11-2 of the chip matching network 11 (and DC isolated and/or common mode isolated, from the first part 11-1 of the chip matching network 11) these wired connections 17 between the DC side of the chip 3-2 and the auxiliary circuit 15 does not create any ground loop. Thus, the auxiliary circuit 15 is able to derive power from the same RF signal as is used for the near field RF communications without risk of coupling the RF inputs of the chip 3 to a DC ground.

Figure 2:
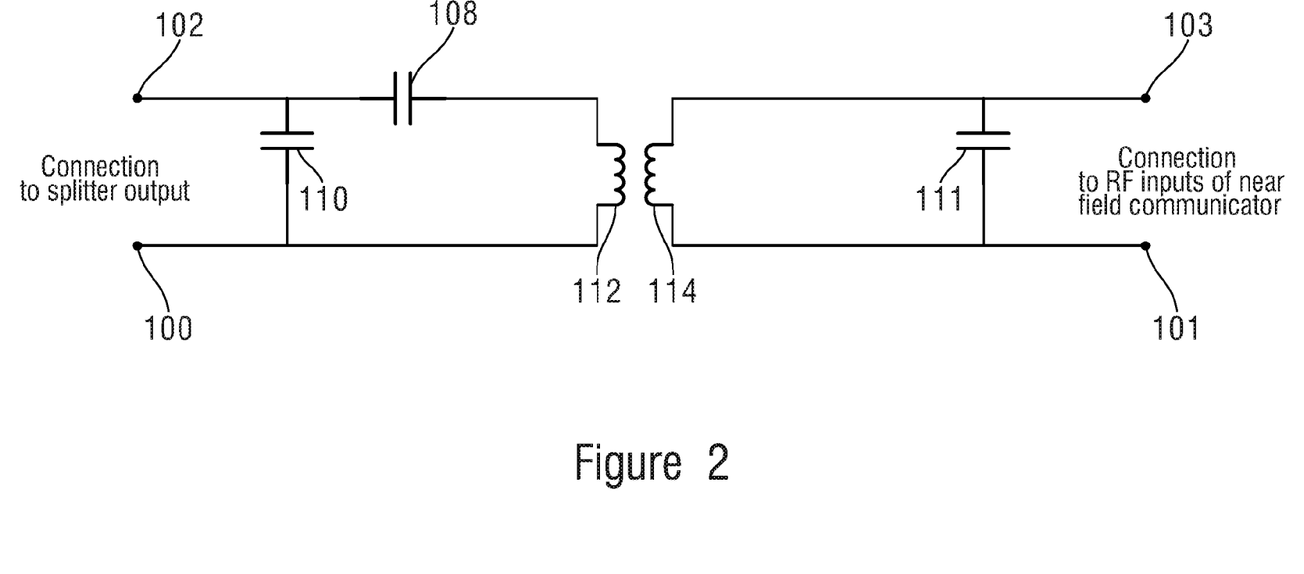
FIG. 2 shows a schematic circuit diagram of an impedance matching network according to the present disclosure.

FIG. 2 shows a chip matching network 11 for use in an apparatus such as that illustrated in FIG. 1.

As illustrated in FIG. 2, the chip matching network 11 comprises a first part 11-1 and a second part 11-2. Each of the two parts 11-1, 11-2 comprises a separate network of impedances connected together by electrically conductive connections (such as conductive track and/or wires).

The first part 11-1 of the chip matching network 11 comprises two input connections 100, 102 for connection to the first output of the splitter 9. It also comprises a first capacitor 108 and a second capacitor 110, and a first inductor 112 (such as that mentioned above).

The second part 11-2 of the chip matching network 11 comprises two output connections 101, 103 for connection to the RF inputs of the near field RF communicator. It also comprises a third capacitor 111, and a second inductor 114 (such as that mentioned above).

In the first part 11-1 of the chip matching network 11 the first inductor 112 is connected to the first input terminal 100, and to one plate of the first capacitor 108. And, the other plate of the first capacitor 108 is connected to the second input connection 102. The connection between the first capacitor 108 and the second input connection 102 is connected to the first input connection 100 by the second capacitor 110.

In the second part 11-2 of the chip matching network 11, the second inductor 114 is connected to the first output terminal, and it is also connected to the second output terminal. The third capacitor 111 is connected in parallel with the second inductor.

The two inductors 112, 114 are spatially arranged relative to each other to provide a sufficiently high coupling factor (for example greater than 0.1, for example greater than 0.2), and a selected mutual inductance. The mutual inductance of the two inductors 112, 114 may be selected by choosing the spatial arrangement of the two inductors. Examples of ways in which this might be done are described below with reference to FIG. 3 and FIG. 4. The position of the first inductor 112, relative to the second inductor 114 is selected in accordance with the first part impedance and the second part impedance. This spatial arrangement may be provided in a variety of ways—for example the inductors may both be provided on a dielectric substrate which fixes the spacing between them. They may be packaged together, such as in a single die bond structure, a surface mount structure (SMD) component. They may be provided in one or more through-holes of a PCB, or other type of dielectric substrate. In these and other embodiments, the two inductors may be wound on a common core, e.g. in the manner of a transformer yoke. The two inductors may be provided by conductive tracks disposed on a dielectric substrate—examples of such inductors comprise so-called printed coil inductors, and some possible configurations of such inductors are described below.

It can thus be seen that the first part 11-1 of the chip matching network 11 comprises a plurality of impedances connected with the first inductor 112. These, together with the self-inductance of the first inductor 112, and the mutual inductance between the first inductor 112 and the second inductor 114, combine to provide the apparent input impedance of the network 11-1 as a whole. Thus, the impedance of the other components in the first part 11-1 of the chip matching network 11 can be chosen so that they combine with the mutual inductance of the two inductors 112, 114, and the self-inductance of the first inductor 112 to provide a "first part" impedance (e.g. an input impedance) which matches the impedance of the first output of the splitter 9.

Similarly, in the second part 11-2 of the chip matching network 11, the apparent mutual inductance of the two inductors and the self-inductance of the second inductor combine with the other impedances in the second part of the chip matching network 11 to provide a "second part" impedance (e.g. an output impedance) which matches the input impedance of the RF inputs of the near field RF communicator chip.

Figure 3:
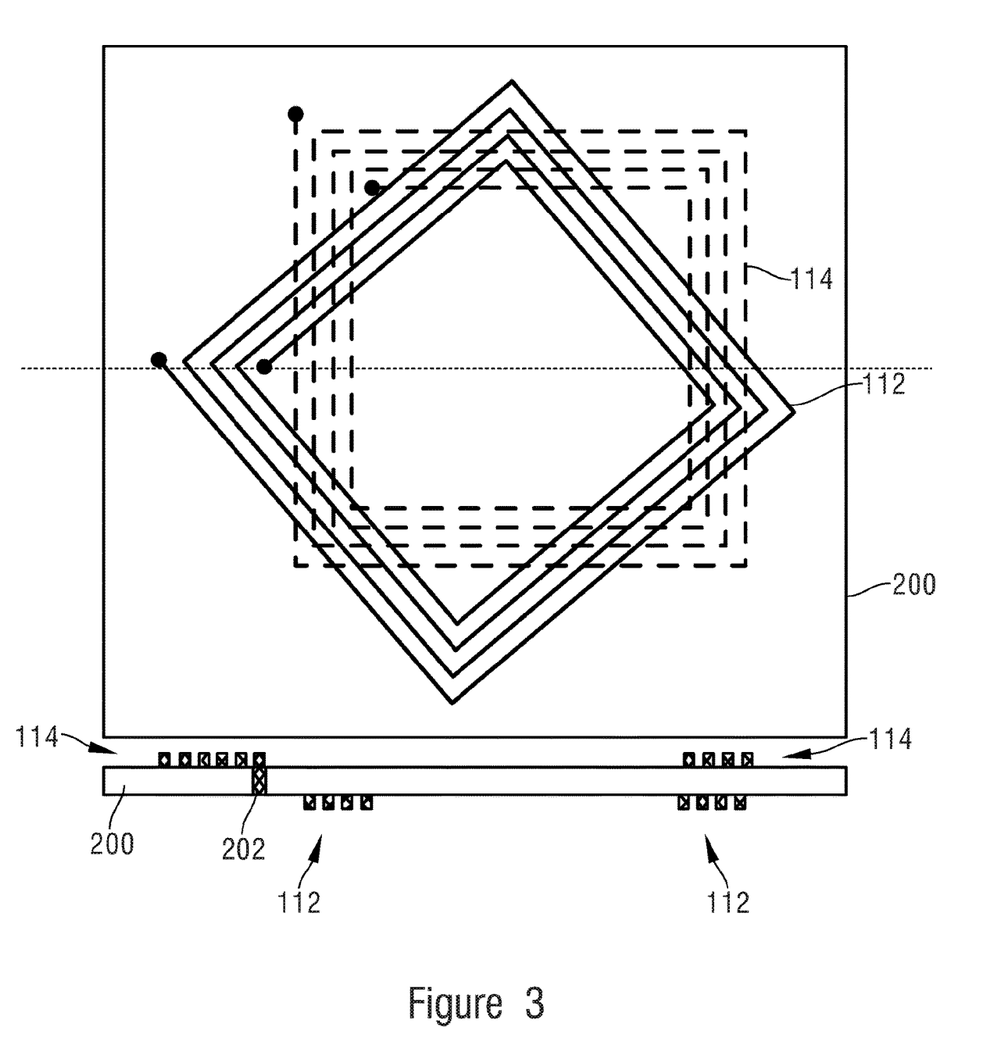
FIG. 3 shows a possible arrangement of inductors for use in a matching network such as that illustrated in FIG. 2 or the apparatus of FIG. 1.

A variety of configurations of the two inductors 112, 114 have been tested. One such configuration is illustrated in FIG. 3 as will be described below, in this configuration the two inductors 112, 114 may each comprise square spiral-type coils of conductive track disposed on opposite surfaces of a dielectric substrate. In one configuration which was tested, the coils each had 7 turns, and occupied a 10 mm square region of the substrate. The substrate had a thickness of 75 μm, the self-inductance of the first inductor was 686 nH, the self-inductance of the second inductor was 565 nH, the coupling coefficient of the two inductors (k) was 0.648, and the arrangement had a quality factor (Q) of 20. Other configurations may also be used.

There can be some significant challenges in providing the desired inductive properties, and sufficient efficiency in the inductive energy transfer between the two parts of the chip matching network 11, in miniaturised circuits such as those which must be provided in smart cards, wearables, and other circumstances in which the form factor is constrained.

FIG. 3 shows a schematic diagram of two inductors 112, 114 carried by a dielectric substrate 200. FIG. 3 comprises a plan view and a section view. The section view is taken at the point indicated by the straight dashed line shown in the plan view. In the plan view, the first inductor is indicated by heavy solid line, and the second inductor is indicated by the broken heavy line to indicate its position on the underside of the dielectric substrate 200.

In FIG. 3, the first inductor 112 comprises laminar conductive track disposed on a first major surface of the substrate 200. The track is arranged in a square spiral-type configuration. The spacing between the conductive tracks in adjacent turns may be even along the length of the conductive track. As illustrated, at one end of the track which makes up the first inductor, a conductive via 202 may be provided through the substrate to enable a connection to be provided on the second major surface of the substrate. The two ends of the track which make up this first inductor may comprise terminals for connection to a matching network such as that illustrated in FIG. 2. These terminals may be provided at a corner of the square spiral, for example the start and end terminals may be provided at the same corner of the square.

Figure 4:
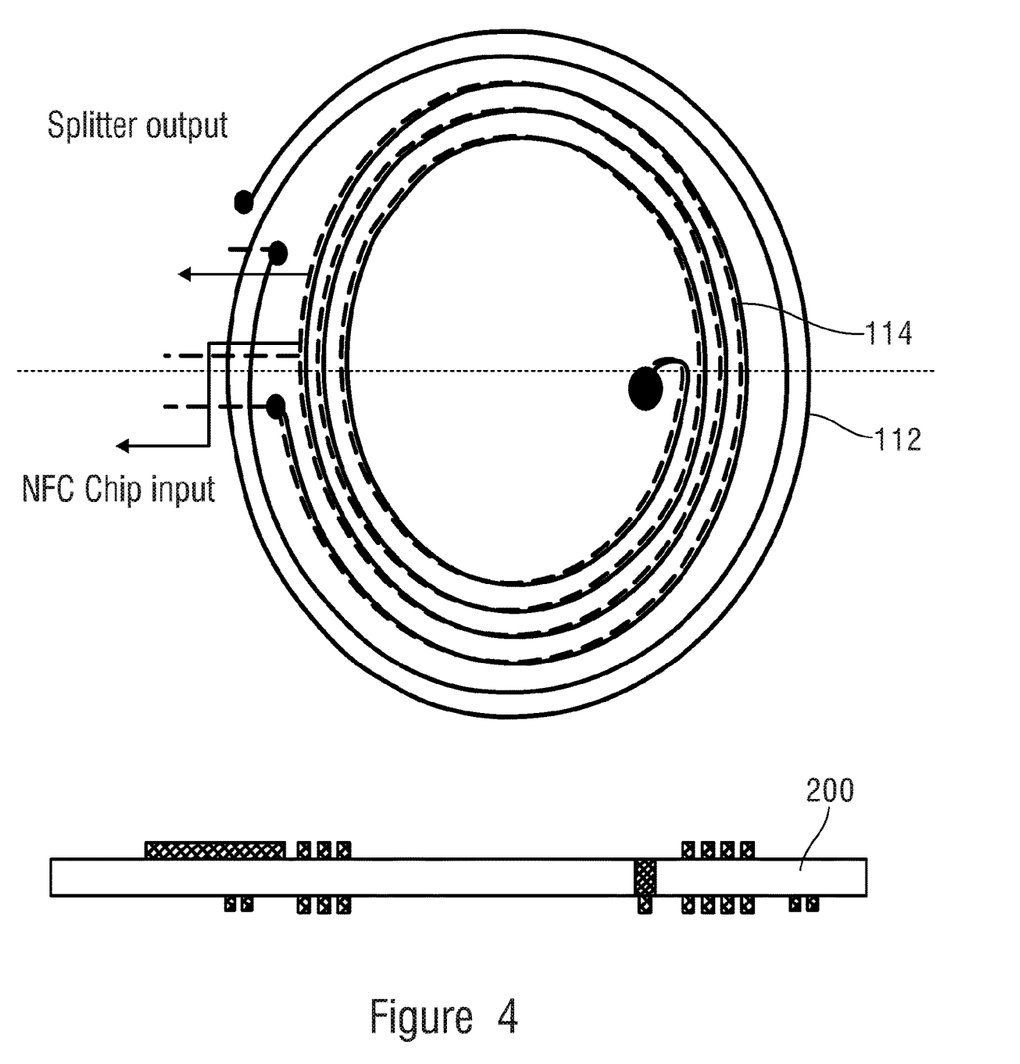
FIG. 4 shows a possible arrangement of inductors for use in a matching network such as that illustrated in FIG. 2 or the apparatus of FIG. 1.

The second inductor 114 also comprises laminar conductive track arranged in a square spiral-type configuration, but disposed on the second major surface of the substrate, opposite to the first surface. The second inductor may also be connected to a conductive via through the substrate to enable a connection to be provided on the first major surface of the substrate. The two ends of the track which make up this inductor may comprise terminals for connection to a matching network such as that illustrated in FIG. 2. These terminals may also be provided at a corner of the square spiral, for example the start and end terminals may be provided at the same corner of the square which makes up the second inductor. The square spiral which makes up the second inductor may also be positioned at an angle (e.g. rotated, in the plane of the surface of the substrate) relative to the first inductor. It will be appreciated in the context of the present disclosure that, although FIG. 4 shows these two inductors as being square spirals, other shapes may be used. To ensure that the connections to each inductor are disposed on an area of the substrate not occupied and/or surrounded by the conductive tracks which provide the other inductor.

As a result of this relative angular offset, the terminals of the first inductor may be provided on a region of the dielectric substrate which is outside the area of the substrate upon which the second inductor is disposed. Likewise, the terminals of the second inductor may be provided on a region of the dielectric substrate which is outside the area of the substrate upon which the first inductor is disposed. This is significant because it can enable the two inductors to be provided on a single layer dielectric substrate and without the need for a SMD (surface mount) inductive component to be used, which can add undesirably to the height of the circuitry components on the substrate.

FIG. 4 shows one such alternative configuration. In the arrangement illustrated in FIG. 4, the first inductor is provided by a circular spiral-type coil of conductive track, comprising three spiral turns, in which the spacing between the tracks which make up adjacent turns (radial spacing) is even along the length of the track. It will be appreciated in the context of the present disclosure that the even spacing is optional.

The coil which provides the first inductor may be disposed on a second major surface of the substrate, and at each end of the coil track, conductive vias may be provided through the substrate so that connections to the first inductor (e.g. to the first part of a chip matching network 11 such as that described above with reference to FIG. 1 and/or FIG. 2) can be provided by conductive track on the first major surface of the substrate.

The second inductor comprises two spiral-type coils, disposed on a region of the substrate which is surrounded by the first inductor. The first spiral-type coil of the second inductor is disposed on the first major surface of the substrate and spirals inward anti-clockwise to a via through the substrate which is disposed in a region of the substrate surrounded by the first spiral-type coil of the second inductor. The via connects to the second spiral-type coil which spirals outward anti-clockwise on the second major surface of the substrate. A further via may be provided at the other end of this second spiral-type coil so that the connections to the second inductor can be provided on the first major surface of the substrate.

The arrangement illustrated in FIG. 2 thus provides a configuration in which one of the two inductors is provided on a first region of the substrate, and the other inductor is provided on a second region of the substrate, and the second region surrounds the first region. The inductor which is provided on the inner region may be disposed on both major surfaces of the substrate to provide a greater total length of inductor (higher self-inductance). This is just one example of the ways in which two coupled inductive coils can be provided on a single layer substrate. Other ways of providing connections to and from the two inductors may be used. So called printed coil inductors are particularly useful in low-profile systems and miniaturised systems because they can avoid the need for packaged components (such as SMD or die bond components), which may either stand proud of the surface or may need to be provided in a recess in the dielectric substrate, such as a through hole. However, in some configurations these components can be used as an alternative—for example, the first inductor and the second inductor may comprise wire wound inductors which may be disposed in the same package, and for example may be wound on the same core, which may comprise a ferrous material.

It will therefore be appreciated that, although two particularly useful arrangements of coupled inductors have been described, a variety of other such arrangements may be employed.

It will be appreciated in the context of the present disclosure that lumped components may comprise discrete capacitors and inductors, as distinct from distributed elements such as microstrips or transmission lines which provide spatially distributed capacitance and/or inductance along their length. One example of a lumped component, which may be of particular utility in the provision of flat, low-profile devices such as smart cards, is a printed coil inductor. Such an inductor may comprise a laminar conductive coil on one surface of a dielectric, which follows a spiral path in from an input connection at the outside of the spiral to a connection through the dielectric inside the spiral. On the other side of the dielectric, a second laminar conductive coil may follow a mirror image of the same path out from this connection to an output connection at the outward edge of the spiral. The output connection may also be connected back through the dielectric so that input and output to the inductor may be provided on the same surface of the dielectric. The dielectric may comprise a substrate upon which a circuit is printed in the manner of a PCB. Other types of printed coil inductors may be used.

It will also be appreciated that although the construction shown in FIG. 3 comprises square spiral-type inductors, and the arrangement shown in FIG. 4 comprises circular spiral type inductors other geometries may be used.

Figure 5:
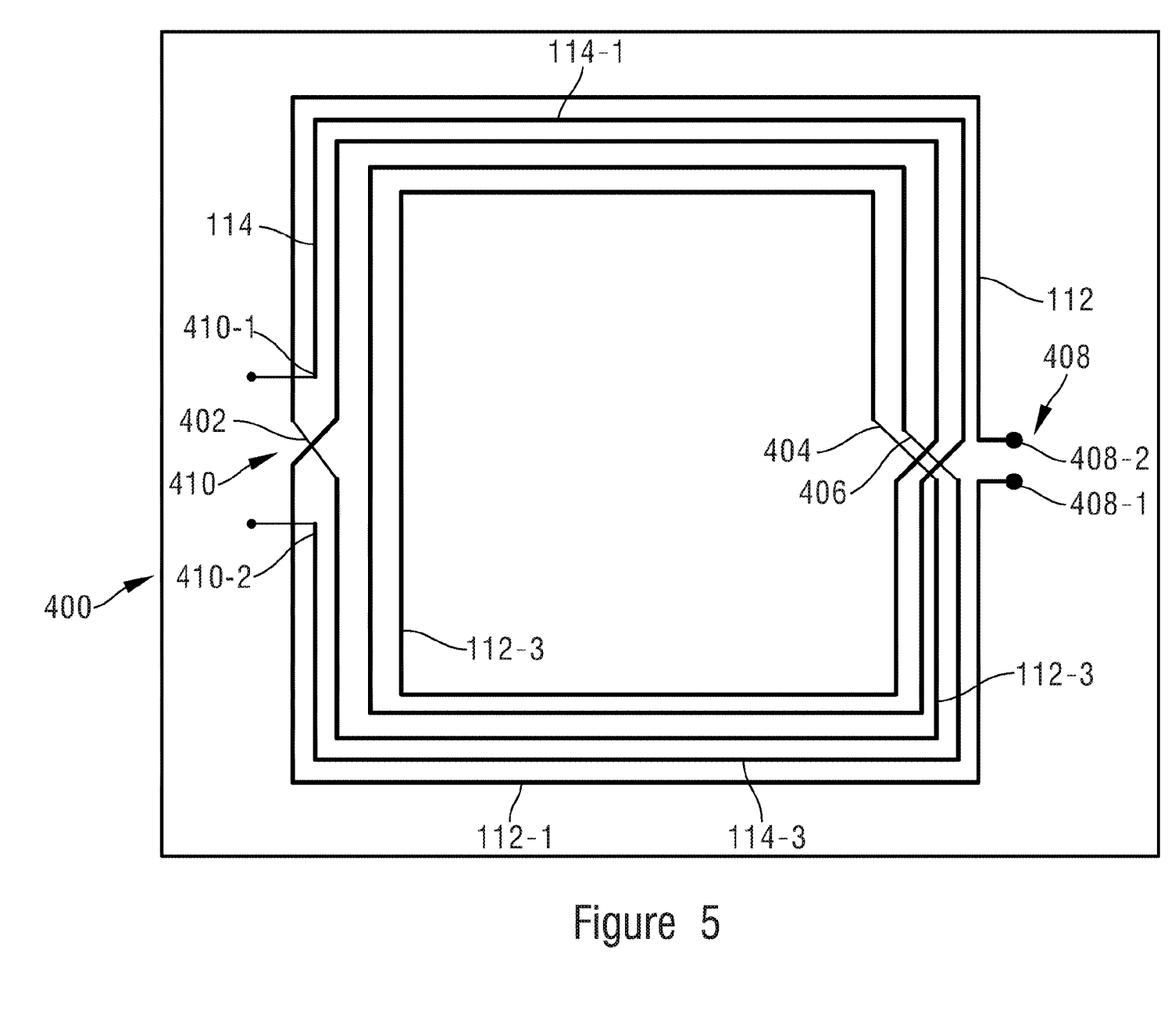
FIG. 5 shows a further possible arrangement of inductors for use in a matching network such as that illustrated in FIG. 2

One example of such a geometry is illustrated in FIG. 5. The arrangement illustrated in FIG. 5 can be used to provide the two coupled inductors 112, 114, for the matching network 11 described with reference to FIG. 1 and/or FIG. 2.

In the structure illustrated in FIG. 5, the first inductor 112 and the second inductor 114 are each provided by tracks of conductive material which are disposed, predominantly, on the same surface of a dielectric substrate 400. The inductors each comprise main tracks on this surface, but conductive links 402, 404, 406 are also provided on the opposite surface of the substrate 400, and connected to the main tracks by vias which extend through the substrate 400 as will be explained below. It can be seen that this arrangement is one way in which the conductive tracks which make up the first inductor 112 can be interleaved with those which make up the second inductor 114, to provide the desired inductive coupling but with DC isolation and common mode rejection. Other coupled coil arrangements may be used.

The coupled coil arrangement shown in FIG. 5 comprises a first inductor 112, and a second inductor 114. The two inductors comprise conductive tracks which are interdigitated with each other so that the two may be arranged on the same area of the same surface of the dielectric substrate 400. It also comprises a splitter input 408 having two connections 408-1, 408-2 for connection to the splitter, and a chip output 410, having two output connections 410-1, 410-2 for connection to the chip.

The first inductor 112 is a coil which has three turns: an inward turn 112-1, an inner turn 112-2, and an outward turn 112-3. The inward turn 112-1 connects a first one 408-1 of the two input connections to one end of the inner turn 112-2. And the outward turn 112-3 connects the other end of the inner turn 112-3 to the second one of the two input connections 408-2. The second inductor is similar, but includes only two complete turns: an inward half-turn 114-1, an inner turn 114-2, and an outward half-turn 114-3. The conductive tracks which make up these two inductors 112, 114, are interleaved with each other.

The inward turn 112-1 of the first inductor spirals inward from the first input connection 408-1 to one end of the inner turn 112-2. The inner turn 112-2 ends with a first via through the substrate. The first via is connected by a conductive link 404 on the opposite side of the substrate 400 to a second via through the substrate. The second via connects the inner turn 112-2 to the outward turn 112-3 of the first inductor 112. The first half of the outward turn 112-3 of the first inductor 112 connects the second via to a third via. Another conductive link 402 on the opposite side of the substrate 400 connects the third via to a fourth via through the substrate. The fourth via is connected, by the second half of the outward turn 112-3, to the second input connection 408-2. It can thus be seen that the inner turn 112-1 is circumscribed by the inward turn 112-1 and the outward turn 112-3, which cross over each other to connect the inner turn 112-2 to the input connections 408-1, 408-2.

The output connections 410-1, 401-2 are arranged on the opposite side of the coupled coil arrangement from the input connections, and may also be on the same surface of the substrate 400. The inward half-turn 114-1 of the second inductor 114 connects the first output connection 410-1 to one end of the inner turn 114-2 of the second inductor 114. The inner turn 114-2 of the second inductor 114 may circumscribe the inner turn 112-2 of the first inductor 112 on the surface of the substrate 400. The other end of the inner turn 114-2 of the second inductor is connected by a fifth via to a conductive link 406 on the other surface of the substrate 400. The conductive link 406 connects the fifth via to a sixth via, and the sixth via is connected by the outward half-turn 114-3 to the second output connection 410-2.

It can thus be seen that conductive tracks may be interleaved on the surface of the dielectric substrate to provide two inductors which are DC and common mode isolated from each other, but which provide inductive, RF, coupling between the two.

Further vias and conductive links may be provided to enable connection to the output connections from the same surface of the substrate as that which carries the two inductors.

To enable the two inductors to be interwoven, vias through the substrate and conductive links on an opposite surface of the substrate have been described with reference to FIG. 5. It will be appreciated in the context of the present disclosure however that the vias are optional and that conductive links of one inductor may cross over the other inductor in a variety of other ways. For example wire links may be used. The two inductors have been shown as square spirals but other shapes are possible. In addition, the tow inductors are shown as having a particular number of turns but a greater or smaller number of turns may be present.

The term "coil turn" has been used herein to refer to a 360° bend, or series of corners, in a spiral form. Such a turn circumscribes an area of the substrate, but need not be closed in the usual sense because it may not start and end at the same location. Thus it may be referred to as a complete loop just as a turn of a spiral may represent a 360° path without being an absolutely closed loop. The term "half-turn" should be interpreted accordingly.

It will be appreciated in the context of the present disclosure that the coupling factor, which may also be referred to as the coupling coefficient, may be the ratio of the open-circuit actual voltage ratio to the ratio that would obtain if all the flux coupled from one circuit to the other. The coupling coefficient is related to mutual inductance and self inductances of the two inductors thus $k=M/sqrt(L_1 L_2)$. Where k is the coupling factor, M is the mutual inductance of the two inductors, $L_1$ is the inductance of the first inductor, and $L_2$ is the inductance of the second inductor. In addition, the concept of common mode rejection has been discussed. It will be appreciated in the context of the present disclosure that this may a metric of the ability of a device to reject common-mode signals, i.e. those that appear simultaneously and in-phase on both inputs. The degree of common mode rejection may be expressed as the ratio of a response to common mode signal to the differential response. In embodiments of the present disclosure, common mode isolation may comprise a circumstance in which the ratio of response to differential signal to the response to a common mode signal is very large, for example greater than 100.

In an embodiment, the first inductor and the second inductor may be provided by coupled inductors, such as those available under the PFD2015 series from Coilcraft, Inc. of 1102, 1697, Silver Lake Rd, Cary, Illinois 60013. One suitable example is the PFD2015-103MEC. At 13.56 MHz this provides a coupling coefficient of k=0.97, a quality factor Q=8, an equivalent parallel inductance of 969 nH, and an equivalent series inductance of 4.2 uH.

As noted above that the splitter described herein may be such as those described in the applicant's copending patent applications GB1805310, GB1807396.5, and GB1811880.2.

For example, the splitter may comprise a splitter, for splitting alternating electrical signals, the splitter comprising a network of lumped capacitors comprising: a first stage, MN1, for connection to an antenna coupling and having a first input impedance Z1 and a first output impedance Z1'; a second stage, MN2, connected to the first stage and to an auxiliary power provider, such as an auxiliary rectifier, for providing a first part of the alternating electrical signal to the auxiliary power provider, the second stage having second input impedance Z2' and a second output impedance Z2; and a third stage, MN3, connected to the first stage and to the chip coupling for providing a second part of the alternating electrical signal to the chip coupling, the second stage having third input impedance Z3' and a third output impedance Z3; wherein the lumped capacitors have capacitance values selected so that the first output impedance, Z1', is equal to the complex conjugate of the sum of the second input impedance, Z2', and the third input impedance, Z3'. Such a splutter network may consist solely of lumped components, such as lumped capacitors. The capacitances of the lumped capacitors may be chosen so that the real part of the first output impedance, Z1', is greater than or equal to the real part of the first input impedance Z1.

Alternatively, the splitter for splitting alternating electrical signals may comprise: a first port connected to the antenna coupling and having a first input impedance; a second port connected to the first port and configured to provide a first part of the alternating electrical signal to the auxiliary power provider; and a third port connected to the first port and configured to provide a second part of the alternating electrical signal to the near field RF communicator; wherein the splitter is configured to maintain the first input impedance so that: the output impedance of the second port is maintained in the event of fluctuations in the output impedance of the third port; and the output impedance of the third port is maintained in the event of fluctuations in the output impedance of the second port. For example, the splitter may comprise a Wilkinson divider.

The absence of capacitive connections between the first part and the second part of the matching network has been mentioned. Whilst it will be appreciated in the context of the present disclosure that in any arrangement of two inductors some parasitic capacitance may be present. However, the arrangement of the first inductor and the second inductor is such that the inductive coupling between them dominates any parasitic capacitance at the frequency of operation of the near field RF communicator, for example 10 MHz to 100 MHz, for example 13.56 MHz.

It will be appreciated from the discussion above that the embodiments shown in the Figures are merely exemplary, and include features which may be generalised, removed or replaced as described herein and as set out in the claims. With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A smartcard comprising:
   a splitter, for splitting an alternating electrical signal received from an antenna of the smart card, the splitter having:
      a first output for providing a first part of the alternating electrical signal to an RF input of a near field RF communicator chip which, in use, is mounted in the smartcard system, and
      a second output for providing a second part of the alternating electrical signal for powering an auxiliary circuit;
   a matching network, at the first output of the splitter, and arranged to provide:
      an input impedance selected based on the impedance of the first output of the splitter, and
      an output impedance selected based on the impedance of an RF input of said near field RF communicator chip;
   wherein the matching network comprises a first inductor for electrical connection to said chip and a second inductor, and
   the second inductor is arranged for inductive coupling to the first inductor thereby to provide RF coupling, with DC isolation and/or common mode isolation, to the RF input of said near field RF communicator chip.

2. The smartcard of claim 1, comprising a dielectric substrate carrying the matching network and separating the first inductor from the second inductor.

3. The smartcard of claim 2 wherein the position of the first inductor, relative to the second inductor is selected to provide a mutual inductance which contributes to matching the impedance of at least one of the splitter and the near field RF communicator chip.

4. The smartcard of claim 1, wherein the matching network comprises:
   a first part, electrically connected to the first output of the splitter and comprising the first inductor; and
   a second part, DC isolated and/or common mode isolated from the first output of the splitter, and comprising the second inductor.

5. The smartcard of claim 4, wherein the first part of the matching network comprises a plurality of impedances connected with the first inductor to provide a first part impedance which matches the impedance of the first output of the splitter.

6. The smartcard of claim 4, wherein the second part of the matching network comprises a plurality of impedances connected with the second inductor to provide a second part impedance which matches the impedance of the RF input of said near field RF communicator chip.

7. The smartcard of claim 1 wherein the first inductor and the second inductor comprise one of (a) a packaged inductor; and (b) printed inductors.

8. The smartcard of claim 7 wherein the first inductor occupies a first region on a first surface of the dielectric substrate and the second inductor occupies second region on a second surface of the dielectric substrate and partially overlapping the first region.

9. The smartcard of claim 8 wherein the first region is misaligned with the second region.

10. The smartcard of claim 9 wherein at least one of the first inductor and the second inductor comprise spiral-type coils.

11. The smartcard of claim 1 wherein the first inductor and the second inductor comprise printed inductors and wherein a first layer of conductive material, provided on the substrate, is configured to provide the first inductor and to provide an electrical connection between the first inductor and the first output of the splitter.

12. The smartcard of claim 11 wherein a second layer of conductive material, provided on the substrate, is configured to provide the second inductor and to provide an electrical connection between the second inductor and the RF input of said near field RF communicator chip.

13. The smartcard of claim 1, wherein the first inductor is separated from the second inductor by the same single dielectric layer of the dielectric substrate.

14. The smartcard of claim 13, wherein the dielectric substrate comprises two dielectric layers with an intermediate electrically conductive layer between the two dielectric layers.

15. The smartcard of claim 14 wherein the intermediate electrically conductive layer is arranged to provide at least one of:
   an electrical connection between the first inductor and the RF input of said near field RF communicator chip; and
   an electrical connection between the second inductor and the first output of the splitter.

16. The smartcard of claim 1 comprising a rectifier, coupled to the second output of the splitter for providing DC power to an auxiliary circuit connected to a DC logic output of said near field RF communicator chip, wherein a DC output of the rectifier provides a ground reference voltage for said DC logic output.

17. The smartcard of claim 1 further comprising said near field RF communicator chip.

18. A near field RF communications apparatus comprising an impedance matching network for connection between a splitter and a near field RF communicator chip,
   wherein the impedance matching network comprises a first inductor for electrical connection to said near field RF communicator chip and a second inductor for electrical connection to said splitter, and
   the second inductor is arranged for inductive coupling to the first inductor wherein the first inductor and the second inductor are interleaved with each other,
   thereby to provide RF coupling, with DC isolation, to an RF input of said near field RF communicator chip.

19. The apparatus of claim 18 wherein the first inductor one of (a) surrounds the second inductor; and (b) is surrounded by the second inductor.

20. The apparatus of claim 18 wherein the first inductor and the second inductor are provided by conductive tracks carried on a dielectric substrate, and the conductive tracks of the first inductor are interleaved with those of the second inductor, for example wherein being interleaved comprises at least one coil turn of the first inductor disposed between two coil turns of the second inductor or vice versa.

* * * * *